United States Patent
Seshadri et al.

(10) Patent No.: US 11,792,315 B2
(45) Date of Patent: Oct. 17, 2023

(54) ADVANCED EYESIGHT DEVICE FOR VISUALLY IMPAIRED

(71) Applicants: Nitin Seshadri, Baldwin, NY (US); Deeya Patel, Ossining, NY (US); Divek Patel, Ossining, NY (US); Karan Keerthy, Briarcliff, NY (US)

(72) Inventors: Nitin Seshadri, Baldwin, NY (US); Deeya Patel, Ossining, NY (US); Divek Patel, Ossining, NY (US); Karan Keerthy, Briarcliff, NY (US)

(*) Notice: Subject to any disclaimer, the term of this patent is extended or adjusted under 35 U.S.C. 154(b) by 434 days.

(21) Appl. No.: 16/933,484

(22) Filed: Jul. 20, 2020

(65) Prior Publication Data
US 2022/0021764 A1    Jan. 20, 2022

(51) Int. Cl.
*H04M 1/72* (2021.01)
*H04M 1/72481* (2021.01)
(Continued)

(52) U.S. Cl.
CPC ......... *H04M 1/72481* (2021.01); *G01S 7/521* (2013.01); *G01S 15/08* (2013.01);
(Continued)

(58) Field of Classification Search
CPC .......... G01S 15/08; G01S 15/86; G01S 15/93; G01S 7/521; G08B 1/08; G08B 29/188;
(Continued)

(56) References Cited

U.S. PATENT DOCUMENTS

| 9,576,460 B2 | 2/2017 | Dayal |
| 10,387,114 B1 | 8/2019 | Shahbaz |

FOREIGN PATENT DOCUMENTS

| BR | 102018009516 | 11/2019 |
| CN | 106161773 | 11/2016 |
| WO | 2018156549 | 8/2018 |

OTHER PUBLICATIONS

Brian Heate. MIT develops a vibrating wearable to help people with visual impairments navigate. Online <http://tcrn.ch/2qPKtnH>. Jun. 2, 2017. Printed on Oct. 28, 2022 (Year: 2017) (Year: 2017).*

(Continued)

*Primary Examiner* — Nader Bolourchi
(74) *Attorney, Agent, or Firm* — Nolte Lackenbach Siegel; Myron Greenspan (57) ABSTRACT

An eyesight device for the visually impaired comprises a case having a front, rear and side walls. An ultrasonic sensor is provided on at least the front wall although, preferably, ultrasonic sensors are provided on the front and side walls to provide a greater range of peripheral vision. A microcontroller within the case is coupled to the ultrasonic sensor. A power source energizes the microcontroller. An audible signal generating means is adapted to generate an audible signal. The microcontroller is programmed to receive the output of the ultrasonic sensor and computing the distance between the case and an obstacle spaced from the case and energize the audible signal generating means when the distance is less than a preselected threshold distance. Attaching means is provided for attaching the case to an item of clothing of the user to free the hands of the user.

17 Claims, 8 Drawing Sheets

(51) Int. Cl.
  *G08B 3/10*    (2006.01)
  *G08B 5/36*    (2006.01)
  *G08B 29/18*   (2006.01)
  *G01S 7/521*   (2006.01)
  *G01S 15/93*   (2020.01)
  *G09B 21/00*   (2006.01)
  *G01S 15/08*   (2006.01)
  *H04M 1/72412* (2021.01)
  *H04N 7/18*    (2006.01)

(52) U.S. Cl.
  CPC ............... *G01S 15/93* (2013.01); *G08B 3/10* (2013.01); *G08B 5/36* (2013.01); *G08B 29/188* (2013.01); *G09B 21/007* (2013.01); *G09B 21/008* (2013.01); *H04M 1/72412* (2021.01); *H04N 7/18* (2013.01)

(58) Field of Classification Search
  CPC .......... G08B 3/10; G08B 5/36; G09B 21/007; G09B 21/008; H04M 1/724095; H04M 1/72412; H04M 1/72481; H04N 7/18
  See application file for complete search history.

(56) References Cited

OTHER PUBLICATIONS

Govardhan et al.,"Smart Object Detector for Visually Impaired," International Journal of Recent Trends in Engineering & Research 2017; pp. 192-195; online: https://web.archive.org/web/20180603030011/http://www.ijrter.com/published_special_issues/31-03-2017/smart-object-detector-for-visually-impaired.pdf.

Sato et al., NavCog3: An Evaluation of a Smartphone-Based Blind Indoor Navigation Assistant with Semantic Features in a Large-Scale Environment; ASSETS '17; Oct. 2017; pp. 270-279; online: https://doi.org/10.1145/3132525.3132535.

\* cited by examiner

ADVANCED EYESIGHT DEVICE FOR VISUALLY IMPAIRED

BACKGROUND OF THE INVENTION

1. Field of the Invention

The invention generally relates to technology for assisting the visually impaired and, more specifically, to an advanced multi-functional eyesight assist device.

2. Description of the Prior Art

Visually impaired people suffer from injuries due to obstacles along the path that they are traveling on or obstacles that approach them. Numerous devices and systems have been proposed to assist visually impaired people to avoid such obstacles. Thus, for example, U.S. Pat. No. 9,576,460 issued in 2016 is for a "Wearable Smart Device for Hazard Detection and Warning Based on Image and Audio Data." The device utilizes a microphone to detect audio data associated with a potential hazard as well as a camera configured to detect image data associated with a potential hazard. The device may use audio and/or haptic output from the wearable smart device to navigate around the hazard. Vibration is mentioned as a way of alerting a user whether to move to the left or to the right to avoid the hazard. Signaling options are also discussed.

U.S. Pat. No. 10,387,114 discloses a system to assist visually impaired users and uses a micro-camera with proximity sensors coupled to the wearable objects to provide relevant audio output transmitted to the air or a speaker of a handheld device.

Brazilian Publication No. 10201800951 published on Nov. 26, 2019 discloses an auxiliary mobility device and method and discloses a wearable device and a vibrating bracelet that communicates with a smart phone by way of Bluetooth to inform a user of obstacles.

International Publication No. WO2018156549 uses a personal navigation system including a module configured to generate an auditory-haptic content that is not visually perceived but perceived by auditory sense or haptic sense to indicate a proposed safety route. Sensors can be operated by a smart walking stick that can generate different sound levels, pitches or frequencies as feedback. The publication also discusses the use of stereophonic cameras to provide depth or distance measurements that indicate the depths of distance measurements. The disclosed device contemplates using wireless technologies such as WIFI, cellular data, Bluetooth, etc.

Chinese Patent No. CN106161773 is for a device based on Android system communicating with an intelligent bracelet worn by a blind person. This reference discusses the use of Arduino Technology and a Bluetooth module embedded inside the bracelet. The bracelet utilizes ultrasonic ranging analyzed by an App to research or determine available routes for a blind person to avoid obstacles.

Also, see Publication entitled "Smart Object Detector For Visually Impaired" Published by the Department of Electronics and Communication Engineering at the Coimbatore Institute of Engineering and Technology. The disclosure discusses a device for visually impaired people to detect objects that are possible obstacles. The project uses the Arduino device and ultrasonic and motion sensors. The device works with a Smartphone when an obstacle is detected and appears proximate to the user to identify and transfer the information to the Smartphone with a smart mobile app. The phone makes a beeping sound or provides a voice command.

An IBM publication entitled "NavCog 3: an Evaluation of a Smart Phone-based Blind Indoor Navigation System with Semantic Features in a Large-Scale Environment" utilizes a Smartphone-based indoor navigation assistant using WIFI, Bluetooth and inertial measurement unit sensors, a camera or a combination of multiple sensors. The cameras collect visual information about the environment about the user.

An Arduino-based voice alert system for blind individuals was developed by Technical Engineer. The device can be worn on the wrist of the user like a band or bracelet and uses an ultrasound sensor to determine the distance from an obstacle to the user, connecting with an Android phone through Bluetooth to generate a voice alert.

Ultrasonic transceivers are used to identify obstacles by employing a micro-controller. The information is sent to the user by a voice using an Android phone using a Bluetooth. The device identities the sounds, searches, destination and paths and suggests the way to the person through voice instructions.

A ring with a camera has been proposed that is intended to be worn on a finger. The proposed device has the same set of problems inherent in other such products just like the cane mounted sensors. It requires the user to point the device ahead or in a direction to see the obstacles. Also, cane mounted or hand mounted devices require the use of hands of the user ties up one or both hands that cannot, then, be used for other, regular activities. Canes can and do break or become damaged and cost becomes an issue with any cane mounted device. Key rings are as good as and have the same disadvantages as carrying a device in a user's hand.

Devices have also been proposed that depend on the use of a central cloud based server that has to connect to the device and then return instructions. Such services typically require the use of a central server and a subscription plan. Such "cloud connected" devices suffer from the issues of subscription and connectivity. If the connectivity over WIFI or Bluetooth is sporadic or lost then the wearer is completely at a loss.

SUMMARY OF THE INVENTION

Accordingly, it is an object of the invention to provide an eyesight device for the visually impaired that does not have the disadvantages inherent in prior art devices.

It is another object of the invention to provide an eyesight device for the visually impaired that is simple in construction and economical to manufacture.

It is still another object of the invention to provide an eyesight device as in the previous objects that can be worn on the body of the user, such as clipped to an item of clothing or a user's belt.

It is yet another object of the invention to provide an eyesight device as in the above objects that is a standalone device and does not need to be incorporated within another device such as a ring, a cane or the like.

It is a further object of the invention to provide an eyesight device of the type under discussion that is provides audible alerts, such as beeps or a CW signal having a variable pitch that is a function of the distance between the user and an obstacle in the path of the user.

It is still a further object of the invention to provide an eyesight device as in the above objects that is lightweight and can be worn for extended periods of time with little or no extra effort.

It is yet a further object of the invention to provide an eyesight device that can be synchronized with a smart phone app for providing alerts from the smart phone when an obstacle is detected.

It is an additional object of the invention to provide an eyesight device as in the previous objects that includes Bluetooth connectivity to issue alerts as a function of distance data between the user and an obstacle.

It is still an additional object of the invention to provide an eyesight device of the type suggested above that includes an optional camera for image detection and to provide voice callouts, using a voice synthesizer, to alert a user with specific information reflecting the nature, use, proximity etc. of the obstacle.

It is yet an additional object of the invention to provide an eyesight device that can be synchronized to an app in a smart phone to provide two-way synchronization and device affinity to prevent interference between proximate similar devices.

In order to achieve the above objects and others that will become evident to those skilled in the art an eyesight device for the visually impaired comprises a case having a front, rear and side walls. An ultrasonic sensor is provided on at least said front wall although, preferably, ultrasonic sensors are provided on said front and side walls to provide a greater range of peripheral vision. A microcontroller within said case is coupled to said ultrasonic sensor. A power source energizes said microcontroller. An audible signal generating means is adapted to generate an audible signal. Said microcontroller is programmed to receive the output of said ultrasonic sensor and compute the distance between said case and an obstacle spaced from said case and energize said audible signal generating means when said distance is less than a preselected threshold distance. Attaching means is provided for attaching said case to an item of clothing of the user to free the hands of the user.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION

Figure 1:
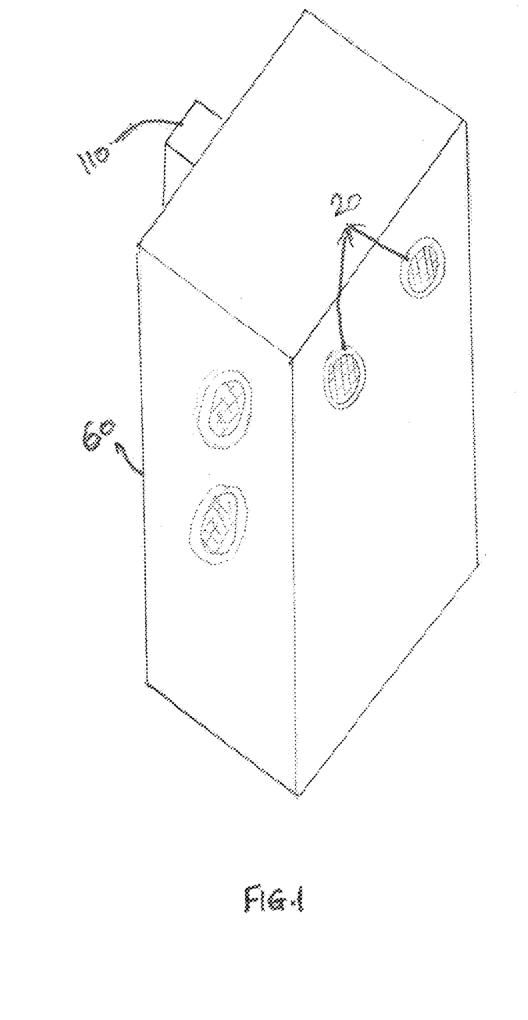
FIG. 1 is a diagrammatic perspective view of a device for assisting the visually impaired people in accordance with the invention.
Figure 2:
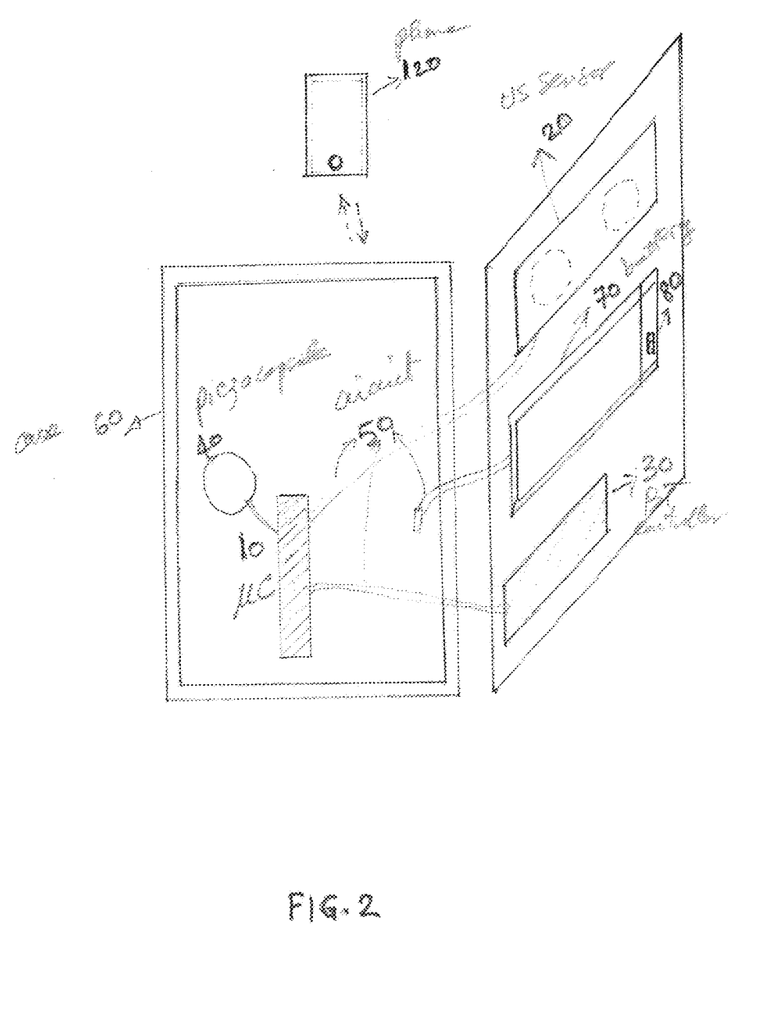
FIG. 2 is an exploded view of the device shown in FIG. 1, showing the major components incorporated into the device and optional smart phone.

Referring now specifically to the Figures, in which identical or similar parts are designated by the same reference numerals throughout, and first referring to FIGS. 1 and 2, a device for assisting the visually impaired in accordance with the invention is generally designated by the designation D.

The device D includes a microcontroller 10, and ultrasonic sensor 20 and a Bluetooth controller 30. The microcontroller 10 uses an Arduino circuit that may be mounted on a printed circuit board (PCB or breadboard). The ultrasonic sensor 20 detects obstacles and measures distances by sending out ultrasonic signals and receiving and detecting signals reflected from items or obstacles. In FIG. 1 multiple ultrasonic sensors 20, 20' or shown for performing such functions in multiple directions to detect obstacles not only in front of the user or the user's direction of movement but also to the sides of the user. Although ultrasonic sensors are only shown on can surfaces of the device D it will be clear that additional ultrasonic sensors may be used and placed on additional surfaces so that alerts may be received not only to address obstacles in front of the user but also to both sides of the user.

The device includes a PSO electric capsule or PSO buzzer 40 issue audible alerts. The aforementioned components form a circuit 50 that can be integrated in a PCB board mounted in a case 60. In FIG. 1, the case 60 is shown as a substantially rectangular housing having a front wall 60 a, sidewalls 60 B, 60 C, a top wall 60 D and a rear wall 60 E. The ultrasonic sensor 20 is mounted on the front wall 60 a. As indicated above, additional ultrasonic sensors 20' can be mounted on the sidewalls 60 B and 60 C. While shown as a substantially rectangular housing this is not critical and the case 60 may take on different configurations.

The circuit 50 is powered by a battery 70. Any battery module may be used, including rechargeable batteries that can be recharged by using a conventional AC converter or adapter. To avoid excessive or unnecessary drain on the battery there is preferably provided an on-off switch 80 so that the device D can't be de-energized when not in use.

Figure 3:
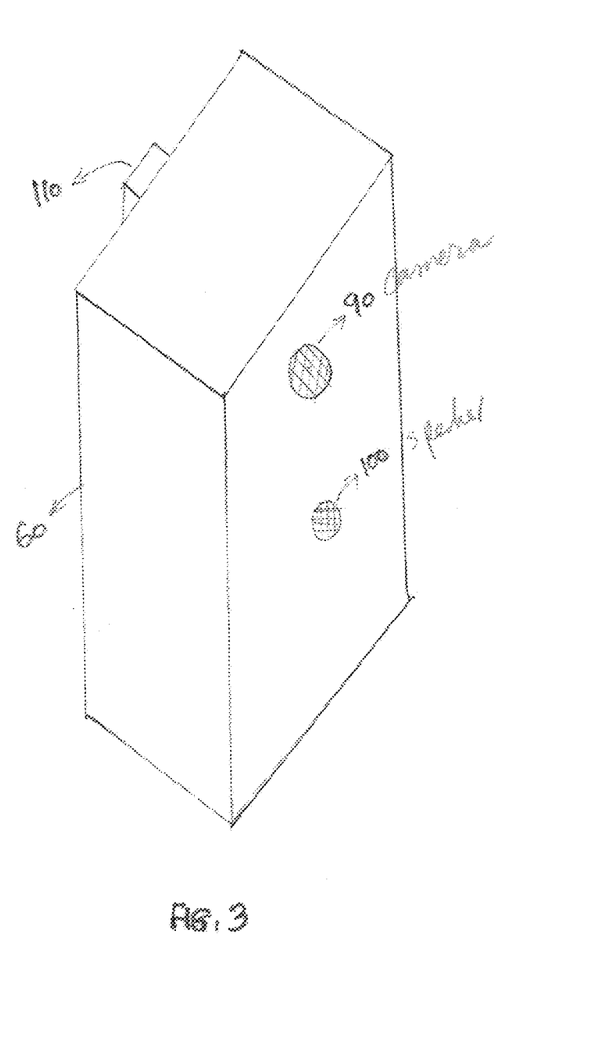
FIG. 3 is similar to FIG. 1, showing an alternate embodiment that incorporates an image sensor and speaker.
Figure 4:
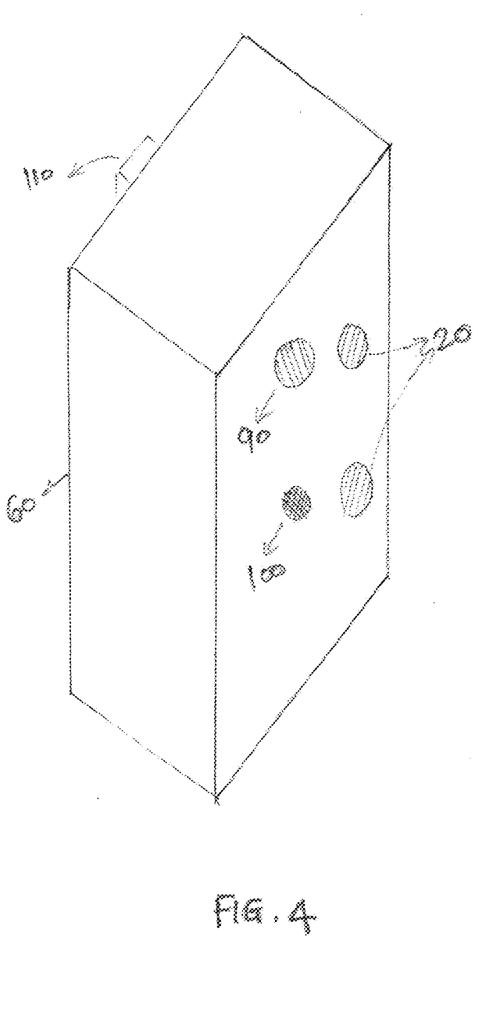
FIG. 4 is similar to FIGS. 1 and 3, showing a still further alternate embodiment that incorporates multiple sensors.

Referring to FIGS. 3 and 4 a similar but different embodiment is depicted that includes an image sensor 90 and a speaker 100.

Figure 5:
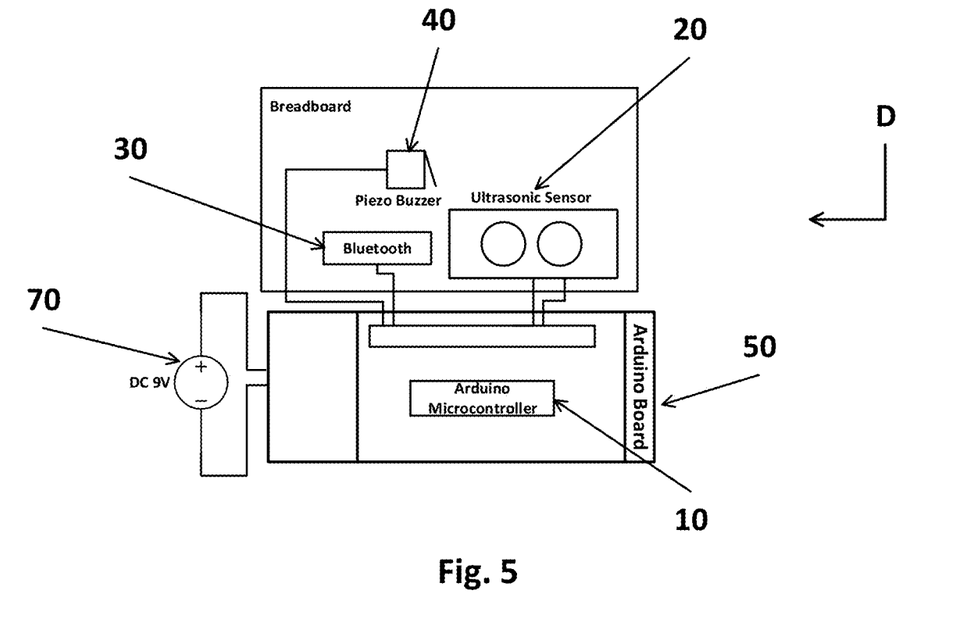
FIG. 5 is a block circuit diagram corresponding to the device shown in FIG. 1.
Figure 6:
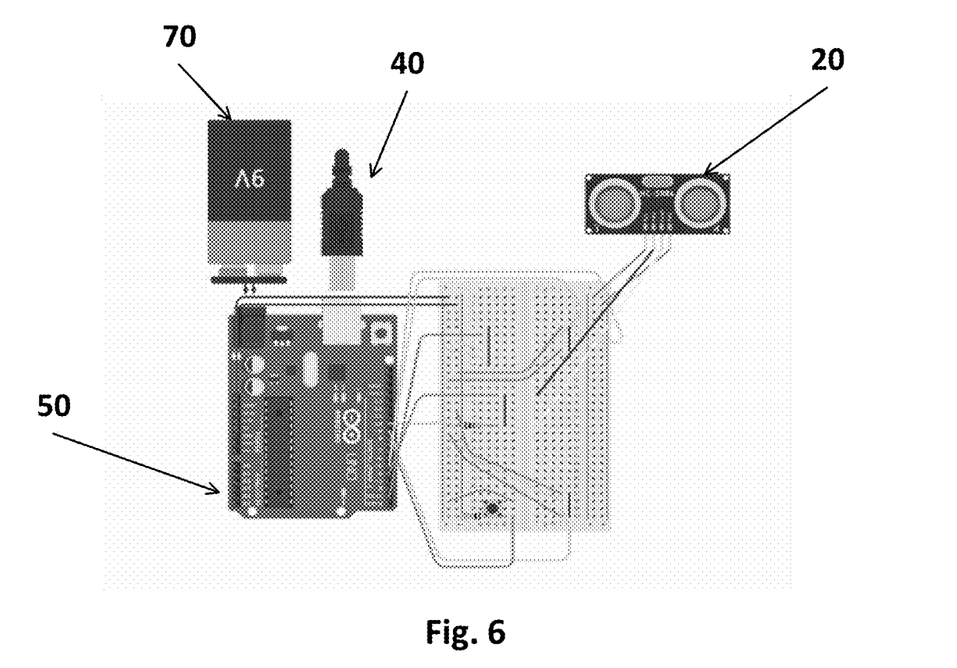
FIG. 6 is an illustration of the bread boarded components corresponding to the blog diagram shown in FIG. 5.

Referring to FIGS. 5 and 6 the embodiment shown in FIGS. 1 and 2 is illustrated with additional detail. The Arduino microcontroller 10 mounted on the PCB is readily and quickly connected to the ultrasonic sensor 20, the buzzer 40 and the Bluetooth controller 30, as well as to the power source or battery 70. All of these components are housed in the case 60, that also houses the battery 70. The case is provided with a clip 110 on the rear or back surface or wall 60 E so that the device D can be attached and secured to a user's belt or clip to an item of clothing. The specific clip used is not critical and any suitable or known clip may be used depending on the manner in which the device is to be secured to the user. The device can be worn on the belt, the pencil skirt or any item of clothing. Once the device is turned on it will start sensing obstacles in close proximity to the person wearing the device. The person gets closer to an obstacle, or the optical such as another person or vehicle approaches the person, the device will provide an audible alarm. The microcontroller 10 is preferably programmed so that the alert or alarm pitch changes as the obstacle comes closer to the person to provide an indication of proximity. The higher the pitch the close of the obstacle. This feedback can be helpful to the user during navigation.

Figure 7:
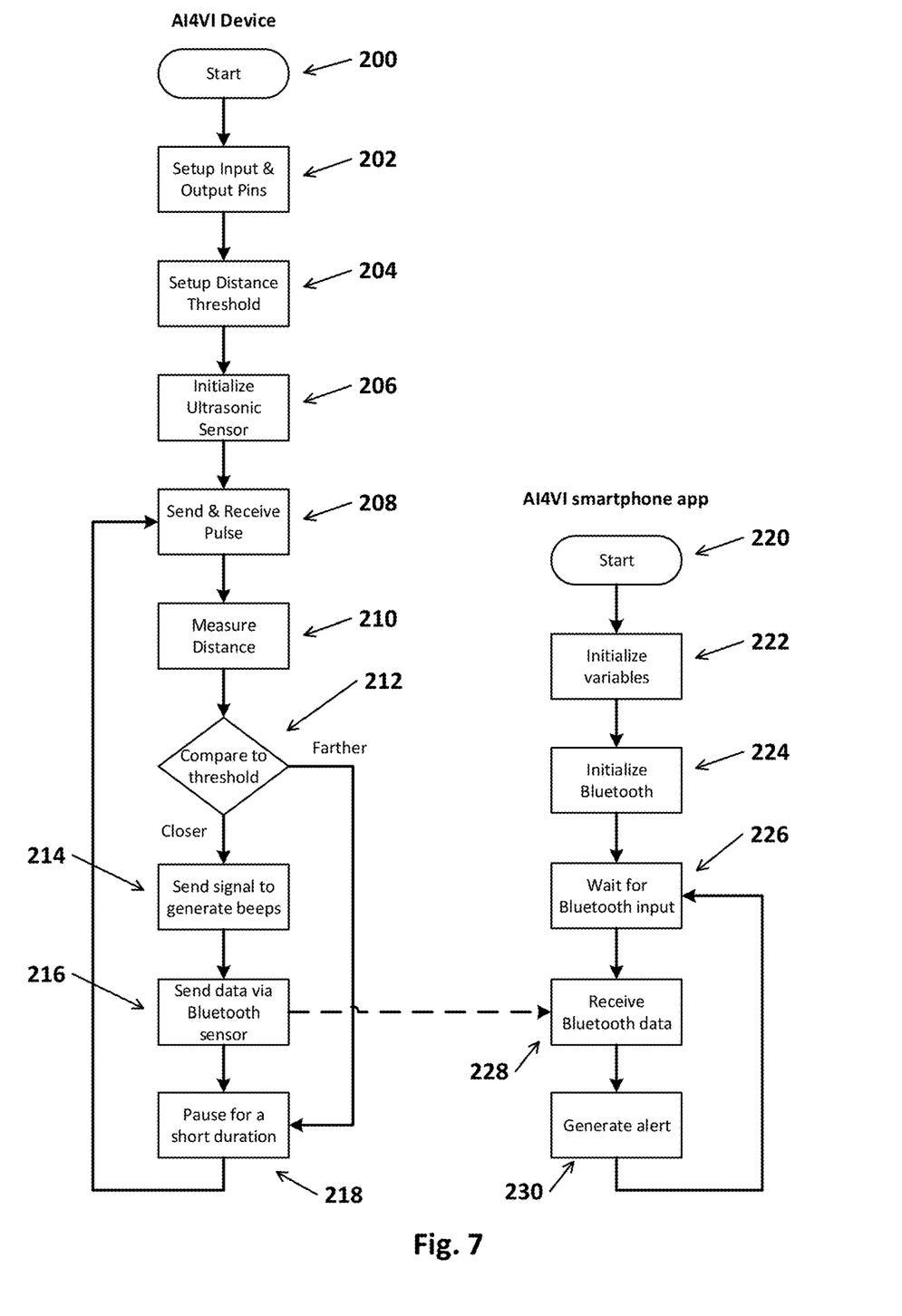
FIG. 7 is a flowchart illustrating the operation of the embodiment represented in FIGS. 5 and 6.

Referring to FIG. 7, the flowchart describes the operation of the device D. At the start 200 input and output pins are set up at 202, and the device can be set up to establish a distance a threshold at 204 at which the device will initiate alerts or alarms. The ultrasonic sensor is initialized the 206 after which the ultrasonic sensor sends and receives reflected pulses at 208. The output of the ultrasonic sensor is used to measure the distance to at 210, such distance is then compared to the threshold distance at 212. In the measured distance is at or closer to this threshold distance selected at 204 a signal is generated at 214 to generate beeps or buzzing sounds by the buzzer 40. When used with a smart phone 120 (FIG. 2) application the device D sends data via the Bluetooth sensor at 216 to the smart phone. At this point, the circuit 50 pauses for a short duration at 218 before resuming sending and receiving pulses at 208. When the comparison of the measured distance is compared to the threshold distance at 212 is further or greater than the threshold distance the circuit pauses for a short duration at 218 before recycling and taking additional measurements at 208.

The present invention contemplates the use of the device D with a smart phone application to provide additional functionalities. Still referring to FIG. 7, when a smart phone app is used the app is started at 222 initialized variables that 222. The user then initializes Bluetooth at 224, after which the app waits for Bluetooth input at 226. When signals are sent to generate beeps or buzzing sounds at 214 that data is sent by the Bluetooth sensor at 216 to be received by the smart phone app at 228. Receipt of such a signal generates an alert on the smart phone at 230. The user, therefore, is provided with two sources of alerts. These can take the form of similar or different sounds, as may be preferred by the user.

The basic wearable sensor for visually impaired people warns them of such obstacles with sound and haptics It is a lightweight wearable device that can be worn on the body for extended periods of time and frees up the hands of the person to go about their normal activities. The device can be used by people that are fully visually impaired as well as moderately to severely visually impaired. Using off-the shelf components, it is an affordable device while providing significant benefits. It detects objects that are above hip-level or fast-moving and can detect obstacles up to 12 ft. The device can be pre-configured for a distance of 3 feet as the threshold. The device provides audible alerts as obstacles move closer and preferably change the frequency or pitch of the alerts as the distances change providing higher pitch alerts as the obstacles get closer. Being lightweight, the device can be worn for extended periods of time. Importantly, the device can be worn on the belt or dress or other item of clothing thus freeing up the hands of the user without compromising the range of vision of the device thereby maintaining the desired direction(s) of detection irrespective of positions of the user's hands. Also, importantly, the device does not require any supplementary device or support subscription services. Although not critical, the device is preferably adapted to be used with an optional companion smartphone app that communicates via Bluetooth with the device and provides haptic alerts on the phone. Thus, such embodiment:

1. Uses an Arduino Uno board along with a full size breadboard;
2. Connects an ultrasonic sensor for detecting obstacles and measuring the distance;
3. Uses a piezoelectric sensor to generate beeps when the distance is within the predetermined or preset threshold value;
4. The board is powered by a 9V battery attached to one side of the board;
5. The Bluetooth sensor outputs the distance data using a serial data delivery;
6. The smartphone companion app detects the Bluetooth signal and outputs the data on the phone. The app also generates a vibrating alert whenever the distance is within the threshold.

Figure 8:
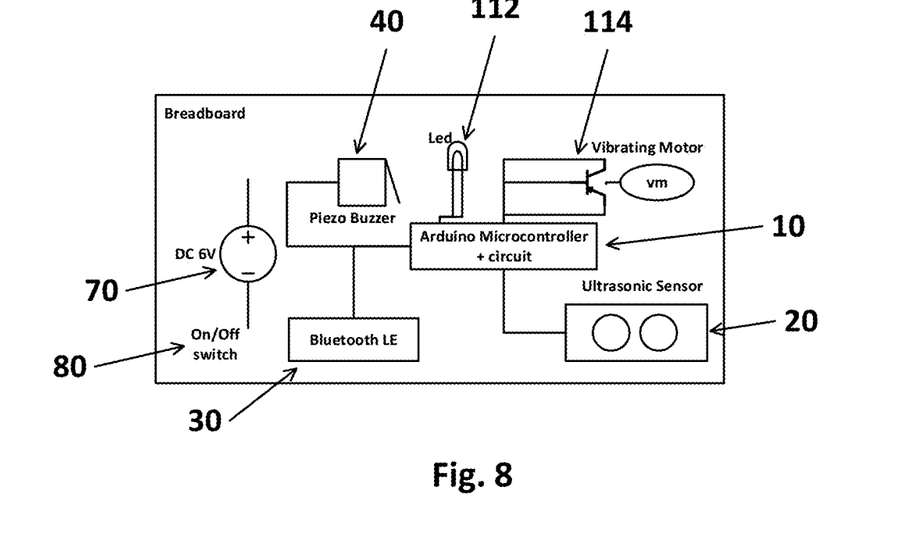
FIG. 8 is similar to FIG. 5 for an alternate embodiment of the device.
Figure 9:
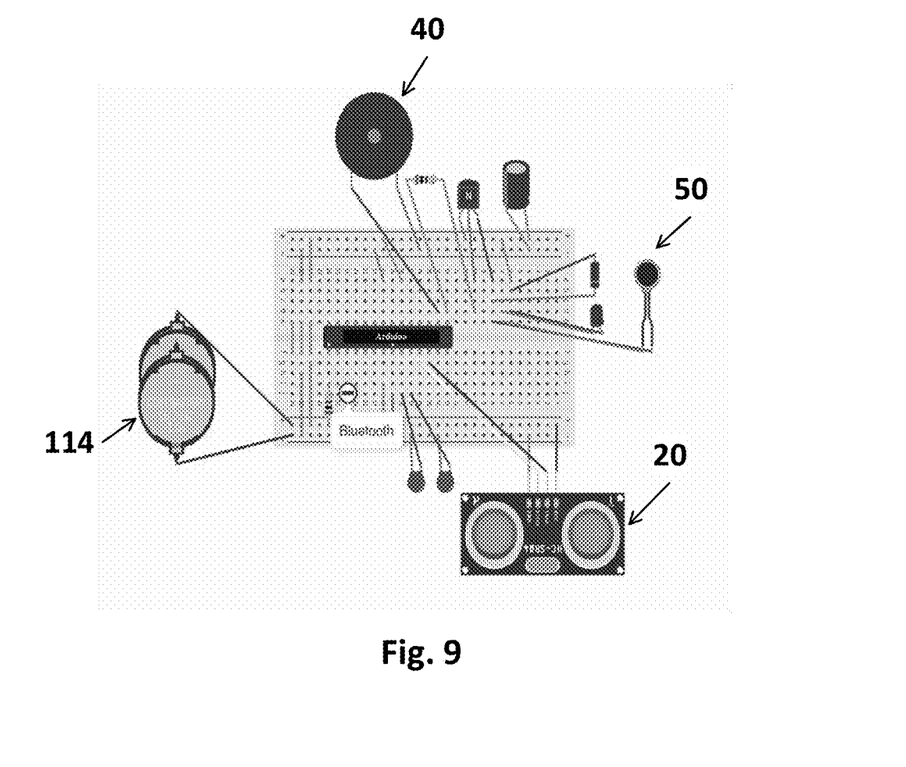
FIG. 9 is similar to FIG. 6 for the embodiment shown in FIG. 8.
Figure 10:
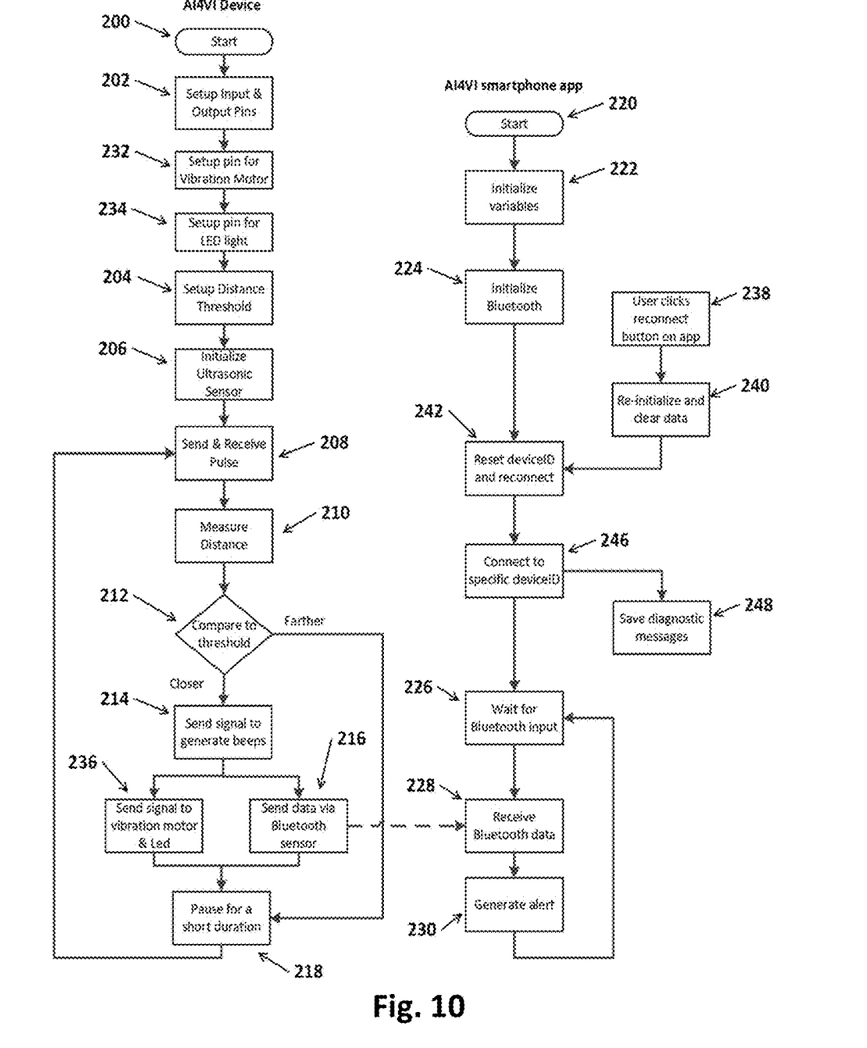
FIG. 10 is similar to FIG. 7 for the embodiment shown in FIGS. 8 and 9.
Figure 11:
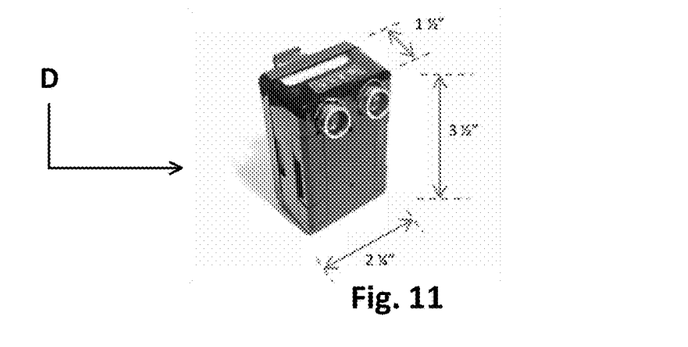
FIG. 11 is a perspective image of the embodiment illustrated in FIGS. 5 and 6.

Referring to FIGS. 8 and 9, modified embodiment is illustrated that, in most respects, is similar to the one described in connection with FIGS. 5 and 6. However, in this modified embodiment the microcontroller 10 is also connected to a light source, such as LED 112 and a vibrating motor 114. Referring to FIG. 10, the flowchart for operating this modified embodiment shown. In addition to the steps previously described in connection with FIG. 7, the vibration motor and LED light are set up at 232 and 234. When a signal is generated to create an alarm or alert the signal is also used to activate or energize the vibration motor and LED at 236. The LED may be useful for those users that are only partially visually impaired but may have the ability to detect changes in brightness. The vibration motor provides a physical feedback that are readily detected and understood by the user.

Still referring to FIG. 7, the smart phone app may also be programmed to detect and synchronize with only a single user's device. User clicks can be used to reconnect or reinitiate smart phone to a single device at 238, the app reinitializing and clearing previously entered data at 240, making it possible to reset the device ID and reconnect at 242, connecting to the user's specific device at 246. The diagnostic messages can be saved at 248. Now, when data is sent via Bluetooth at 216 and alert will be generated at 230 only when the data is received from the user's specific device.

The second version of the device and the companion app provide improvements over the first version. The device and the app provide all the features of the first version and uses an Arduino Uno microcontroller directly on a breadboard with minimal circuitry thereby reducing the device size to ½ the original size. The circuitry is also set up such that it does not need a lot of space inside the case. As a result, the device is substantially smaller and even more lightweight so can be worn for even more extended periods. The device uses a small form factor power source with coin-type batteries that are embedded within the casing that reduces the overall size. The device has a hardware on/off switch and uses a piezoelectric sensor to generate beeps when the distance is within the threshold. The pitch also increases or decreases as the object moves closer or farther from the wearer to provide additional input to the user. When the distance of an obstacle is within the threshold, the device also uses a vibration motor to provide haptic alerts using a sub-circuit that includes a transistor for switching. The control program also sends a signal to an LED that lights up when the obstacle is within the threshold distance. The device uses a Bluetooth Low Energy sensor module that outputs the distance data using serial data delivery. The app is now able to connect and disconnect with the device from within the app without restarting the app. It also provides more details for the alerts and provides diagnostic messages for troubleshooting.

The features of the second embodiment are:
1. Uses an Arduino Uno microcontroller directly on a breadboard with minimal circuitry thereby reducing the device size to ½ the original size;
2. Uses a small form factor power source that can be embedded within the casing to reduce overall size. The device also has a hardware on/off switch;
3. Uses a piezoelectric sensor to generate beeps when the distance is within the preset threshold value;
4. When the distance of an obstacle is within the threshold value, the control program also sends a signal to the vibration motor using a sub-circuit that includes a transistor for switching;
5. The control program also sends a signal to an LED that lights up when the obstacle is within the threshold distance;
6. Uses a Bluetooth Low Energy sensor module that outputs the distance data using serial data delivery;
7. The smartphone companion app detects the Bluetooth signal and outputs the data on the phone. The app also generates a vibrating alert whenever the distance is within the threshold distance; and
8. The app is now able to connect and disconnect with the device from within the app without restarting the app. It also provides more details for the alerts and provides diagnostic messages for troubleshooting.

Figure 12:
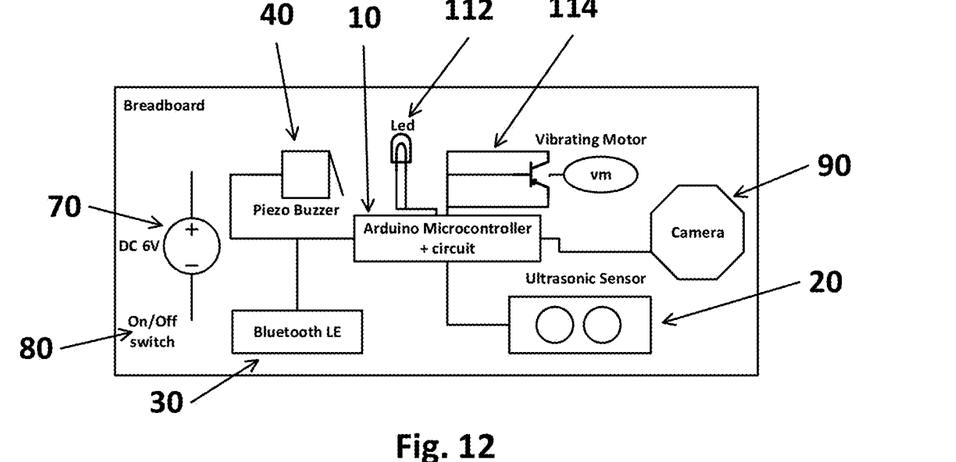
FIG. 12 is similar to FIGS. 5 and 8 for a still further embodiment of the device.
Figure 13:
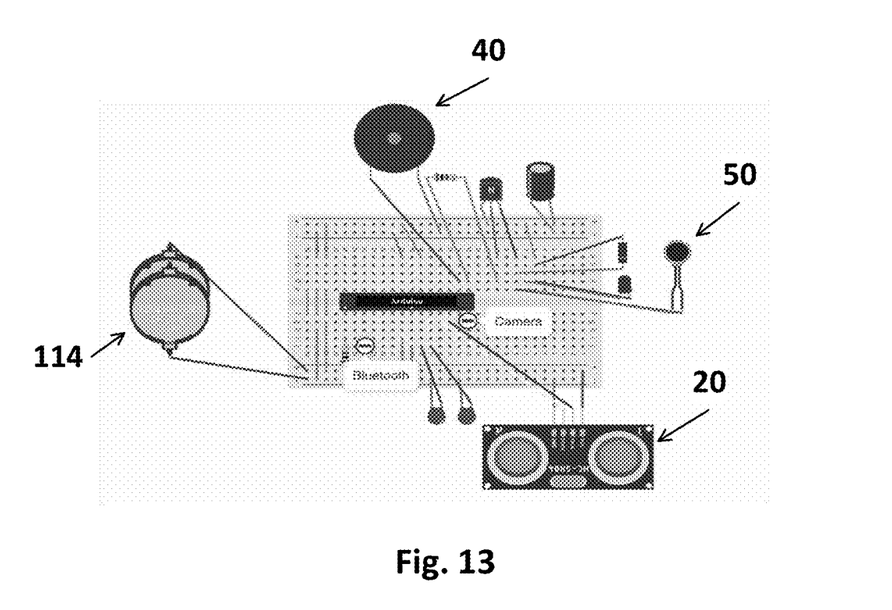
FIG. 13 is similar to FIGS. 6 and 9 for the embodiment shown in FIG. 12.
Figure 14:
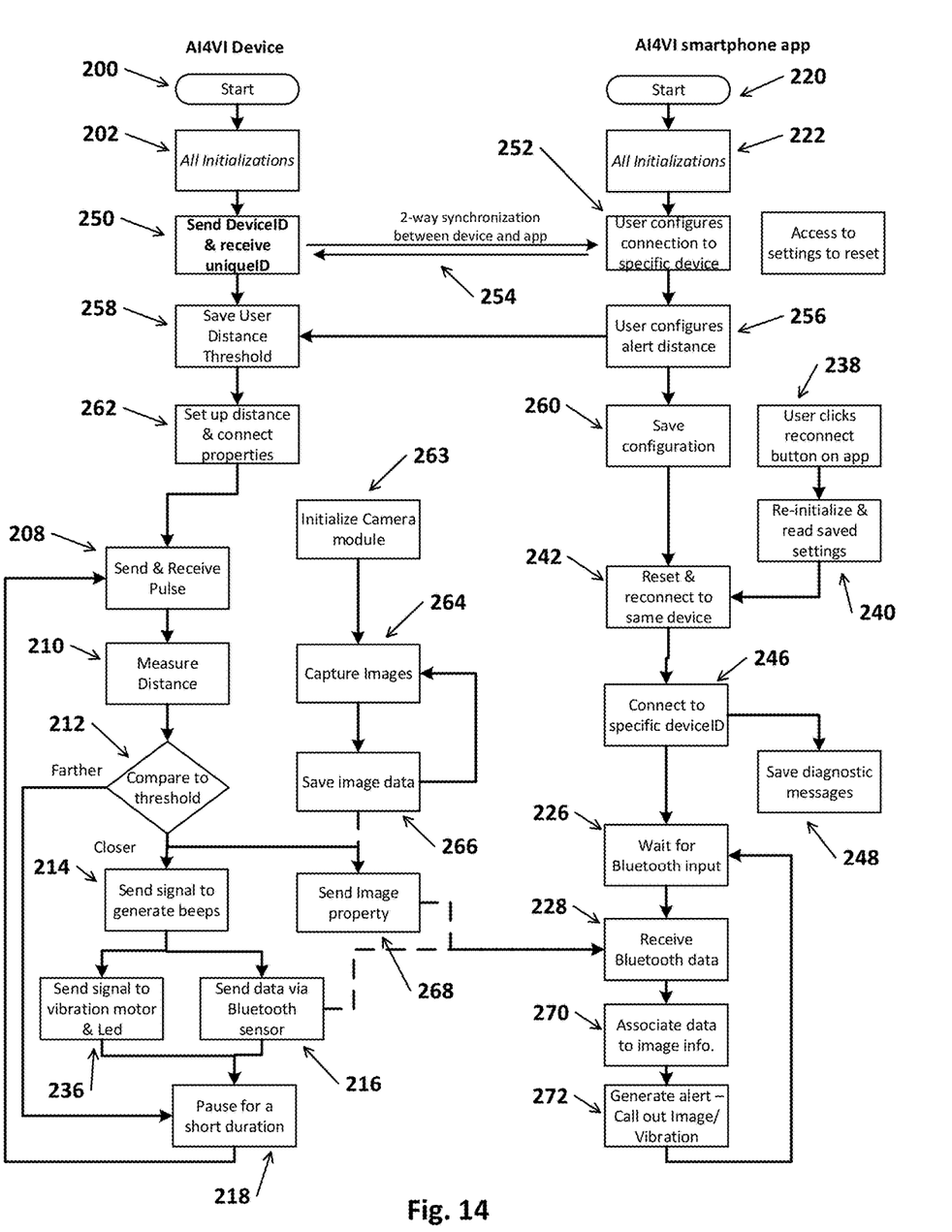
FIG. 14 is similar to FIGS. 7 and 10 for the embodiment shown in FIG. 12.

Referring to FIGS. 12 and 13 a further embodiment is shown that is modified to include a camera 116 also connected to the microcontroller 10. In this embodiment, the image sensor or camera 90, used with or without the ultrasonic sensor, is used to detect visual images and interpret the nature of the obstacle using hardware and software to provide additional audible feedback to the user through the speaker 100. When used together with the ultrasonic sensor, the device can provide more accurate feedback to the user. Referring to FIG. 14, many of the steps described in connection with FIGS. 7 and 10 are the same. However, in FIG. 14 the device ID is sent and received at 250, the smart phone app configuring the connection to the specific device at 252 by means of the two-way synchronization between the device and the app at 254. The user can now with threshold distance on the smart phone at 256 and such user selected threshold distance is saved in the device at 258. This configuration is saved on a smart phone at 260, and the device setup the distance and connect properties at 262. To use the camera, the camera module is initialized at 263 and images are captured at 264. Image data is saved at 266 and further images are again captured at 264 in a loop to continuously monitor the images of the approaching obstacle. The saved image properties are sent to the smart phone at 268 and the plot of data is received at 228 the smart phone app associates the data to the image information at 270 in the app generates an alert, calling out the image and/or causing the motor to vibrate at 272. In this embodiment, therefore, the app provides verbal alerts, by means of a conventional voice synthesizer, providing the user with voice descriptions of the nature, size and/or shape of the obstacle detected by the camera. Therefore, the camera 90, connected to the microcontroller 10 can detect visual images and interpret the nature of the obstacle using hardware and software to provide additional audible feedback to the user through a speaker 100. As suggested, the image sensor or camera can be used with or without the ultrasonic sensor to provide more accurate and complete feedback to the user. As also suggested, multiple ultrasonic sensors and/or multiple image sensors mounted at various angles aimed at different directions in relation to the direction of movement of the user can be used to provide a greater area of coverage.

The third version of the device and the companion app provide all the features of the second version and, in addition, the device can now attempt to use a camera module with image detection and recognition ability to provide computer vision ability. The signals are sent to the companion app for voice callouts via a voice synthesizer. The device and app are now able to synchronize both ways. The companion app can be used to configure the device to set and save settings as well as provide connectivity to a particular device providing device affinity. The device can also save the settings internally to communicate only to that particular smartphone app. The distance threshold can be configured using the app. Once the device and app are linked the app will only try to connect to that mated device until changed. This helps the app on the phone to only connect to a specific device and not to other similar devices nearby. The app can also be used to reset and clear settings to connect to another device. Thus, the circuit and device are now improved for better resiliency and robustness.

The features of the third embodiment are:
1. Uses an Arduino Uno microcontroller directly on a breadboard with minimal circuitry thereby reducing the device size to ½ the original size;
2. Uses a small form factor power source that can be embedded within the casing to reduce overall size;
3. Uses a piezoelectric sensor to generate beeps when the distance is within the threshold value;
4. When the distance of an obstacle is within a preset threshold value, the control program also sends a signal to the vibration motor using a sub-circuit that includes a transistor for switching. The circuit is now improved for better resiliency;
5. The control program also sends a signal to an LED that lights up when the obstacle is within the threshold distance;
6. The device now attempts to use a camera module with image detection and recognition ability to provide computer vision ability. The signals are sent to the companion app for voice callouts via synthesizer;
7. Uses a Bluetooth Low Energy sensor module that outputs the distance data using serial data delivery;
8. The smartphone companion app detects the Bluetooth signal and outputs the data on the phone. The app also generates a vibrating alert whenever the distance is within the threshold distance value;
9. The app is now able to connect and disconnect with the device from within the app without restarting the app. It also provides more details for the alerts and provides diagnostic messages for troubleshooting;
10. The device can now communicate both ways with the companion app. The companion app can be used to configure the device to set and save settings as well as provide connectivity to a particular or specific device. The device will also save the settings internally to communicate only to that particular app; and
11. Once the device and app are linked they app will only try to connect to that device until changed. This helps the app on the phone to only connect to my device and not to other devices nearby. The app can also be used to reset and clear settings to connect to another nearby device.

A hip or body mounted sensor is better suited because of its ability to sense a wider angle with multiple ultrasonic sensors that are pointed in 2, 3 or more different directions, and recognize low lying as well as above hip level objects while freeing up a user's hands to provide a more efficient and safer experience to the user.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An eyesight device that is wearable and hands-free for the visually impaired comprises a case having a front, rear and side walls; a sensor on each of said front wall and side walls; a microcontroller within said case coupled to said sensors; a power source for energizing said microcontroller; and audible signal generating means for generating audible, vibratory and light signals, said microcontroller being programmed to receive the outputs of said sensors and compute the distances between said case and an obstacle spaced from at least from one of said sensors on said case and energize said signal generating means when said distance is less than a predetermined threshold distance; and attaching means suitable for attaching said case to an item of clothing at waist level of a user to render the device wearable and hands-free, said sensors, said microcontroller, said power source, said audible signal generating means and said attaching means being arranged on or within said case to form a single integrated wearable unit that can be attached to and worn handsfree by a user while providing detection coverage at the front, sides above and below the waist level of the user.

2. A device as defined in claim 1, wherein said microcontroller comprises an Arduino controller.

3. A device as defined in claim 1, wherein said attaching means comprises a spring-loaded clip.

4. A device as defined in claim 3, wherein an ultrasonic sensor is mounted on said front wall and said clip is mounted on said rear wall.

5. A device as defined in claim 1, wherein said microcontroller is programmed to set a predetermined threshold distance and to energize said signal generating means only when at least one of said sensors measures a distance to an obstacle less than said threshold distance.

6. A device as defined in claim 5, wherein said microcontroller is programmed to issue an audible signal having a pitch that is a function of the distance of an obstacle from said at least one of said sensors.

7. A device as defined in claim 1, wherein said microcontroller is programmed to mate or sync with a smartphone app to transmit distance data to a smartphone to generate alerts on the smartphone.

8. A device as defined in claim 1, wherein said vibratory signal is generated by a vibrating motor.

9. A device as defined in claim 1, wherein said light signal is generated by at least one LED.

10. A device as defined in claim 1, wherein said audible signal is generated by a Piezo element or buzzer.

11. A device as defined in claim 1, further comprising an image sensor connected to said microcontroller for generating an image of an obstacle detected by any of said sensors.

12. A device as defined in claim 11, wherein said image sensor comprises a camera.

13. A device as defined in claim 12, in combination with a smartphone coupled or mated with the device, and connectivity means for transmitting distance data calculated by said microcontroller to said smartphone.

14. A device as defined in claim 13, wherein said smartphone is provided with an app that translates or converts the distance data to verbal alerts.

15. A device as defined in claim 13, wherein said smartphone is programmed to recognize at least one of shape, size, direction of movement of an obstacle detected by any of said sensors and to issue verbal alerts identifying information characterizing the obstacle.

16. A device as defined in claim 13, wherein said connectivity means comprises Bluetooth connectivity.

17. A device as defined in claim 1, wherein said microcontroller is programmed to enable setup of said preselected distance threshold prior to use of the device.

* * * * *